No. 896,018. PATENTED AUG. 11, 1908.
F. E. & E. A. HETRICK.
EGG TESTER.
APPLICATION FILED OCT. 8, 1907.
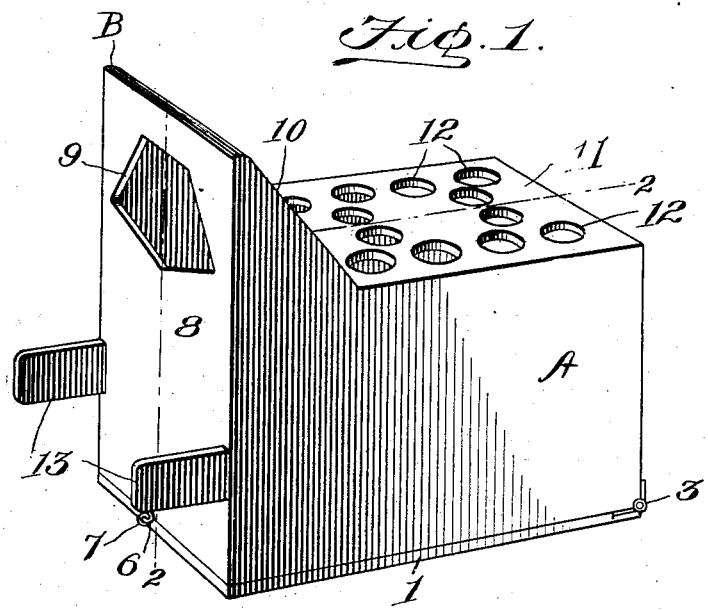
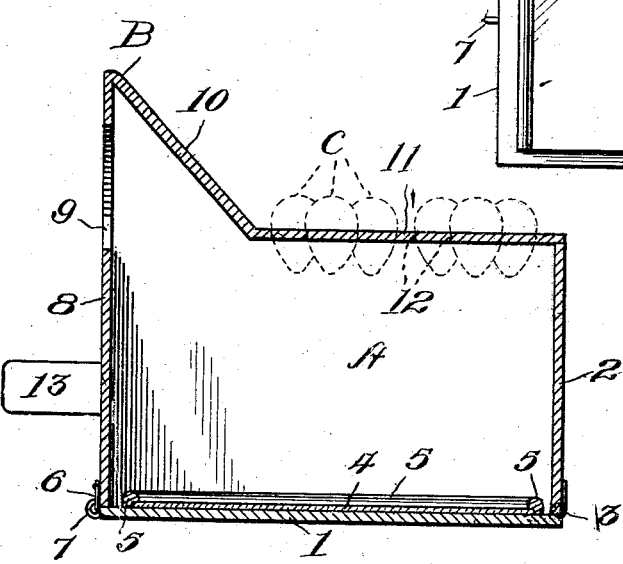
Witnesses
J. T. L. Wright,
C. Bradway.
Inventors
Franklin E. Hetrick
Elmer A. Hetrick
By Victor J. Evans,
Attorney

UNITED STATES PATENT OFFICE.

FRANKLIN E. HETRICK, OF DUBOIS, PENNSYLVANIA, AND ELMER A. HETRICK, OF AKRON, OHIO.

EGG-TESTER.

No. 896,018.  Specification of Letters Patent.  Patented Aug. 11, 1908.

Application filed October 8, 1907. Serial No. 396,459.

*To all whom it may concern:*

Be it known that we, FRANKLIN E. HETRICK, a citizen of the United States, residing at Dubois, in the county of Clearfield and State of Pennsylvania, and ELMER A. HETRICK, a citizen of the United States, residing at Akron, in the county of Summit, and State of Ohio, have invented new and useful Improvements in Egg-Testers, of which the following is a specification.

This invention relates to an egg testing device of that type comprising a box having egg-receiving openings in its top and a mirror on the bottom opposite the eggs so that the reflection of the rays of light from outside passing through the eggs can be seen through a suitably arranged peep opening, the light spots on the mirror representing the good, and the comparatively dark spots, the bad eggs.

The invention has for one of its objects to provide an egg tester of the character referred to which is thoroughly reliable and so designed that eggs can be conveniently and quickly tested.

A further object of the invention is the provision of an egg tester in which the bottom of the box is hingedly connected with the body of the latter and carries the mirror so that the box can be tilted upwardly and backwardly so as to expose the mirror for conveniently cleaning the same or renewing it in case of breakage.

A still further object is the provision of an upward extension at one end of the box which has a peep opening through which the mirror can be observed and which also affords an inclined reflecting surface whereby the rays of light can be directed on the eggs while in position for testing.

The invention has as a further object the novel arrangement of egg-receiving apertures in the top of the box whereby a plurality of eggs can be placed or removed at one time by each hand of the tester.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention. Figure 1 is a perspective view of the egg tester. Fig. 2 is a longitudinal section on line 2—2, Fig. 1. Fig. 3 is a plan view of the mirror-carrying bottom of the tester.

Similar reference characters are employed to designate corresponding parts throughout the several views.

Referring to the drawing, A designates the hollow box-like body of the tester which is provided with a bottom 1 that is connected at its rear end to the rear wall 2 of the body by hinges 3, whereby the body can be tilted upwardly when it is desired to open the tester. On the top side of the bottom 1 is a flat reflecting mirror 4 that has its three edges engaged under the strips 5 secured to the bottom 1, the mirror being slipped in or out from the fourth side, as will be clearly understood from Fig. 3. The bottom is normally fastened to the body of the box by a hook 6 on the front of the body which engages in an eye 7 on the front end of the bottom.

The body A is provided with an upward extension B at the front, which has its front formed by the continuation of the front wall 8 of the body, and the extension is provided with a peep opening 9 in this wall through which the mirror 4 can be seen. The back wall 10 of the hollow extension B is inclined so that the rays of light striking the same will be reflected upon the eggs, the surface being preferably white for increasing the reflection. The top 11 of the box from the wall 10 to the rear wall 2 may be, and preferably is, parallel with the mirror and is provided with egg-receiving apertures 12. These apertures are arranged in groups of three conveniently close together so that three eggs can be inserted or removed by each hand of the tester. In practice, it has been found most convenient to arrange the groups in threes, but, of course, this is not absolutely necessary, although it has the advantage of enabling the tester to place and remove the eggs with great rapidity. Projecting forwardly from the front of the box are handles 13 whereby the tester can be conveniently handled.

In practice, the eggs are set in the openings 12 in the top of the box, as shown by the dotted lines C, Fig. 2, and the rays of light, which may be from the sun or an artificial source, pass through the eggs and show on the mirror. The tester observes the mirror through the opening 9 and will note the bad eggs which fail to transmit the rays of light as freely as the good eggs, and thus produce darkened spots on the mirror. The spots on the mirror will occupy the same relative position as the eggs on the box, so that it is an easy matter to pick out the good from the bad eggs. After one set of eggs is tested, they are removed and another set replaced and tested as before. It will thus be seen that the device is extremely simple to operate and that the eggs can be tested in a quick and reliable manner.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claims.

Having thus described the invention, what we claim is:—

1. An egg tester comprising a box having egg-receiving openings in its top and provided with a hood rising from the top at the front thereof, a bottom plate on which the box normally rests, a mirror disposed flat on the bottom plate at a point under the egg-receiving openings, hinges connecting the bottom of the rear wall of the box to the rear end of the bottom plate for permitting the box to be opened and to rest on the said rear wall, and means for detachably fastening the front of the box to the bottom plate.

2. An egg tester comprising a box open at its bottom and having egg-receiving openings in its top and a peep opening in its front, a bottom plate to which the box is hingedly connected to permit the latter to be thrown open and rest in open position on its rear wall, a mirror resting on the top of the plate, undercut strips fastened to the bottom plate to receive the edges of the mirror, one edge of the mirror being presented to one of the side walls of the box to coöperate with the said strips for holding the mirror in place, and a fastening device for removably holding the box and bottom plate in closed position.

In testimony whereof I affix my signature in presence of two witnesses.

FRANKLIN E. HETRICK.

Witnesses:
T. K. HETRICK,
G. WOODRING.

In testimony whereof I affix my signature in presence of two witnesses.

ELMER A. HETRICK.

Witnesses:
CHAS. ESSELBURN,
GEO. H. ELLIS.